Sept. 18, 1928.
J B. GREEN
1,684,391
CONTAINER FOR ANNEALING AND SIMILAR PURPOSES
Filed Jan. 26, 1927
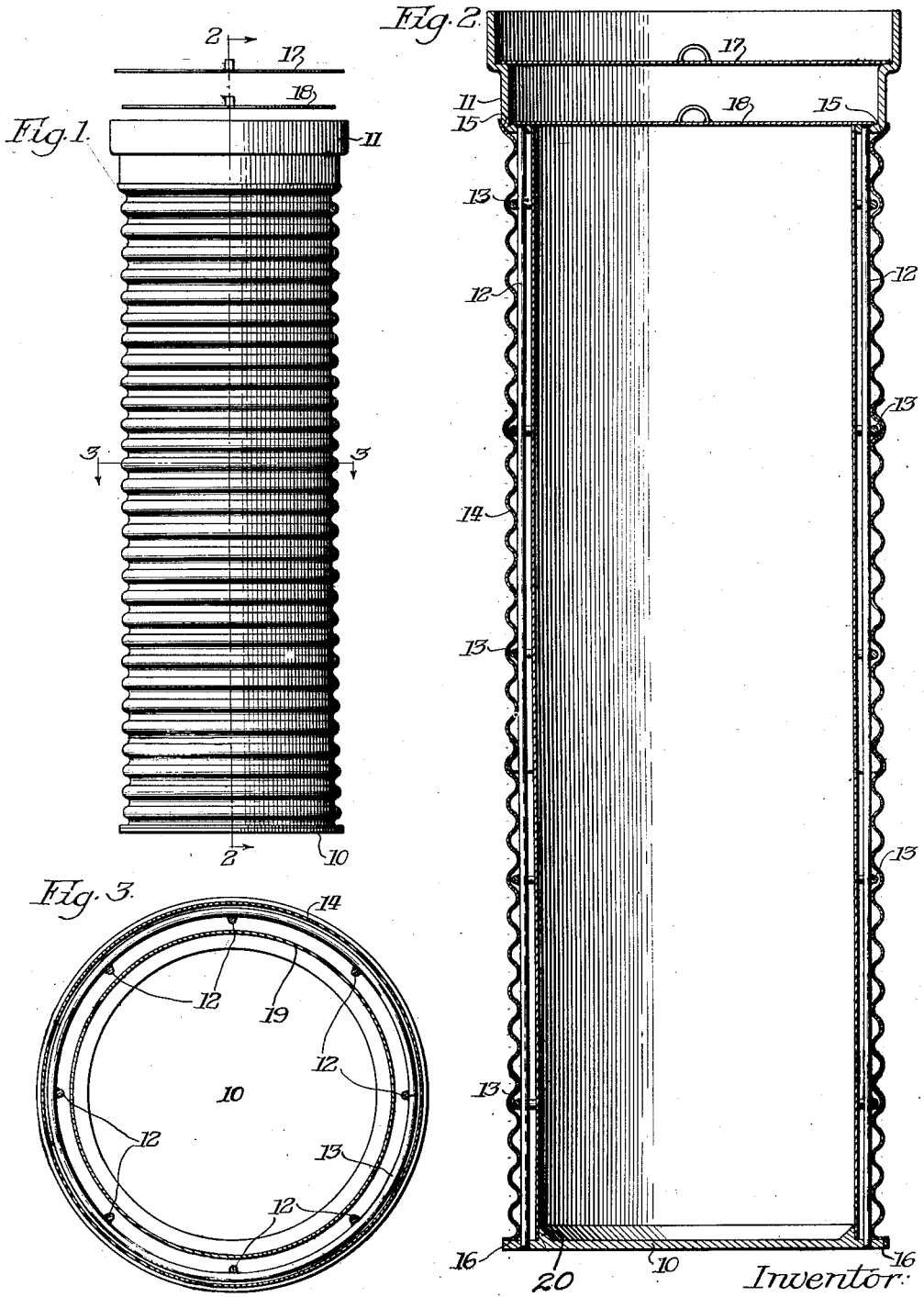
Inventor:
J Birchard Green Patented Sept. 18, 1928.

1,684,391

UNITED STATES PATENT OFFICE.

J. BIRCHARD GREEN, OF CHICAGO, ILLINOIS.

CONTAINER FOR ANNEALING AND SIMILAR PURPOSES.

Application filed January 26, 1927. Serial No. 163,581.

My invention relates to the materials and their structural combination in containers suitable for use in the annealing of metals and any other practices where the contents are subjected to high temperatures.

The object of my invention is to provide more durable containers of this type than have hitherto been generally used and in most instances also at lower initial cost.

Another object is to provide containers of such materials and construction that they permit heat to be more readily transferred to their contents and also require a lesser quantity of heat to bring them up to the temperature desired than has heretofore been generally possible.

I have in mind the heat treating and annealing of metals primarily wherein the containers and contents are brought to at least a red heat so that when such containers are made of ordinary ferrous metals they deteriorate by scaling and when strength is required such metals at elevated temperatures prove too weak unless far heavier sections are provided than other requirements of the case otherwise necessitate. The heating of materials in closed containers to red heats or higher temperatures is so common in the arts and industries that it is conceivable there are very many applications for my invention other than those of heat treating and annealing metals. Burning and annealing clay and glass products, by-product coke manufacture and the like, might be mentioned as illustrative.

As nearly every application differs in detail, it is impossible to be specific so far as either materials or exact design are concerned except as individual examples are cited by way of illustration only. In general, my invention may be described as consisting of one or more metallic anchorage pieces into which rods are fastened, preferably by fusion welding. The rods are of metals having a high tensile strength at elevated temperatures, such as hypereutectoid carbon steel, chrome steels and the like. These rods are so formed as to furnish a skeleton framework for the vessel. Also attached to the anchorage piece or pieces, preferably by fusion welding, is a corrugated metallic sheet, covering the skeleton frame-work and forming the outer surface of the fired vessel. This sheet is made of metal which resists scaling at elevated temperatures, such as stainless steel, aluminum treated steel, Monel metal and the like.

The corrugations of this sheet cover should always be in such direction that the expansion and contraction due to heating and cooling results in compressing and expanding the corrugations thus relieving the strain on the joints. The corrugations also offer a greater surface for heat transfer without substantially increasing the total weight of the vessel.

A pot for annealing wire can be constructed in this manner so that its weight is about 600 pounds as compared to a cast steel or iron pot capable of holding the same charge weighing 3300 pounds and a hammer or fusion welded one of mild steel weighing about 1400 pounds. The initial cost is about one half that of the cast pot, one third that of the hammer welded one and slightly less than the mild steel plate one fusion welded. It far outlasts any of these and, because of its ability to transfer heat rapidly on account of the thin sheet wall (this being so thin as well as corrugated that its thickness far more than offsets the lower heat conductivity of most scale resisting metals) and small weight, requires far less time and heat to accomplish the desired treatment of the contents. This represents a substantial saving in operating costs.

A pot for annealing wire is shown in the accompanying drawing but, as previously suggested, this is for purposes of convenient illustration only. The type of vessel I have invented finds a greater use in annealing sheet steel, malleable castings and the like. This is done in rectangular boxes instead of tubular pots, but similar materials and principals of design can readily be applied to such shapes and many others, as would be required in a particular case. In special cases, the anchorage piece or pieces can be dispensed with and under some conditions also the skeleton frame-work or both. In the latter event, a corrugated fusion welded sheet shell of scale resisting material would be left.

In the accompanying drawing:

Fig. 1 is a side view of an annealing pot constructed in accordance with the invention;

Fig. 2 is a vertical section through the pot, taken on the line 2—2 of Fig. 1; and Fig. 3 is a transverse section through the pot, taken on the line 3—3 of Fig. 1.

It will be observed in the drawing that the particular vessel therein illustrated includes a circular plate 10 at one end and a circular band 11 at the other end. These end anchorage members are coupled together by a number a longitudinally extending tie rods 12, which are arranged at regular intervals circumferentially of the members and are secured in apertures in the same. A number of hoops 13 may encompass the rods at regular intervals longitudinally of the same.

A thin tubular shell 14 of scale-resisting material is fitted about this skeleton frame-work, and is welded to the peripheries of the members at 15 and 16. The shell is preferably corrugated circumferentially of the same in order to expand longitudinally of the vessel without strain or distortion under the intense heat to which the vessel is subjected in service. The open end of the vessel is closed by two spaced covers 17 and 18 which seat upon ledges formed in the band 11.

If the vessel is to be used for the treatment of wire, or for the treatment of other metallic forms requiring a smooth surface on the inside of the vessel, a tubular lining 19 is fitted within the skeleton frame work, and one end of the lining 19 is welded about the inner edge of the band 11, while the other end is telescoped over a cylindrical rib 20 on the plate 10 in order to slide thereon when the frame-work undergoes longitudinal expansion.

I claim:

1. A container for annealing and similar purposes composed of one of more anchorage pieces, a skeleton frame-work, and a sheet covering, said container being elongated and said covering being corrugated in a direction transversely of the elongation.

2. A container for annealing and similar purposes composed of a skeleton frame-work, a sheet covering about the frame-work, and a sheet lining within the frame-work.

3. A container for annealing and similar purposes consisting of anchorage members at the ends of the container, longitudinally extending frame members connected to said anchorage members, and a thin sheet metal shell encasing said frame members and connected to said anchorage members.

4. A container for annealing and similar purposes consisting of anchorage members at the ends of the container, longitudinally extending frame members connected to said anchorage members and a thin sheet metal shell surrounding said frame members and welded to said anchorage members, said shell being corrugated transversely of said frame members.

5. A container for annealing and similar purposes consisting of an elongated skeleton frame-work, a corrugated shell fitted about the outside of said frame-work, a plain shell fitted about the inside of said frame-work, and end closures for the container.

In testimony whereof I have hereunto subscribed my name.

J BIRCHARD GREEN.